United States Patent [19] [11] Patent Number: 5,031,035
Abe [45] Date of Patent: Jul. 9, 1991

[54] COLOR IMAGE PROCESSING APPARATUS WITH COLOR GHOST CORRECTION

[75] Inventor: Yoshinori Abe, Tama, Japan

[73] Assignee: Konica Corporation, Tokyo, Japan

[21] Appl. No.: 378,758

[22] Filed: Jul. 12, 1989

[30] Foreign Application Priority Data

Jul. 15, 1988 [JP] Japan .................. 63-176748
Jul. 15, 1988 [JP] Japan .................. 63-176749

[51] Int. Cl.⁵ .................................. H04N 1/46
[52] U.S. Cl. ........................... 358/80; 358/75
[58] Field of Search ............. 358/75, 8, 461, 462, 358/453

[56] References Cited

U.S. PATENT DOCUMENTS

| 4,538,182 | 8/1985 | Saito et al. | 358/80 |
| 4,591,905 | 5/1986 | Noguchi | 358/75 |
| 4,623,917 | 11/1986 | Noguchi | 358/75 |
| 4,707,713 | 11/1987 | Ayata et al. | 358/75 |
| 4,841,361 | 6/1989 | Matsunawa et al. | 358/75 |
| 4,908,716 | 3/1990 | Sakano | 358/462 |
| 4,937,662 | 6/1990 | Matsunawa et al. | 358/75 |
| 4,942,461 | 7/1990 | Abe et al. | 358/75 |

Primary Examiner—Howard K. Britton
Assistant Examiner—Kim Yen Vu
Attorney, Agent, or Firm—Finnegan, Henderson, Farabow, Garrett, and Dunner

[57] ABSTRACT

Disclosed is an image processing apparatus for processing a color image signal obtained by converting color image information on a document into an electric signal. In the apparatus, a color ghost is corrected from the color of the color image signal in accordance with a predetermined correction manner. When a marked region on the document with a coloring member different from the color of the document is detected and an image process is performed in relation to the marked region, the predetermined correction manner is changed.

7 Claims, 10 Drawing Sheets

| No. | COLOR PATTERNS | TARGET PIXEL CHANGE |
|---|---|---|
| 1 | WHITE WHITE BLUE BLUE BLACK BLACK BLACK | BLUE ⟶ BLACK |
| 2 | WHITE WHITE BLUE BLUE BLUE WHITE WHITE | BLUE ⟶ BLUE |
| 3 | WHITE WHITE WHITE RED BLACK BLACK BLACK | RED ⟶ BLACK |
| 4 | WHITE WHITE RED RED RED WHITE WHITE | RED ⟶ RED |

PERIPHERAL PIXELS  PERIPHERAL PIXELS
TARGET PIXEL

FIG. 7

| N | M | COLOR PATTERNS | PATTERN SIZE |
|---|---|---|---|
| 2 (WHITE BLACK) | 3 | 8 | 1 × 3 |
| | 5 | 32 | 1 × 5 |
| | 7 | 128 | 1 × 7 |
| 3 (WHITE BLACK RED) | 3 | 27 | 1 × 3 |
| | 5 | 243 | 1 × 5 |
| | 7 | 2187 | 1 × 7 |
| 4 (WHITE BLACK RED BLUE) | 3 | 64 | 1 × 3 |
| | 5 | 1024 | 1 × 5 |
| | 7 | 16384 | 1 × 7 |
| | 9 | 262144 | 3 × 3, 1 × 9 |

FIG. 8

| No. | COLOR PATTERN | | | | | | | CHANGE OF TARGET PIXEL | |
|---|---|---|---|---|---|---|---|---|---|
| | | | | | | | | NORMAL RECORD MODE | PARTIAL COLOR CONVERSION MODE |
| 1 | X | BLUE | RED | BLACK | RED | RED | X | X | | |
| 2 | X | RED | BLACK | BLACK | RED | RED | X | X | | |
| 3 | X | RED | RED | BLACK | BLACK | RED | X | X | | |
| 4 | X | RED | RED | BLACK | RED | X | X | X | BLACK → RED | BLACK → BLACK |
| 5 | X | WHITE | RED | BLACK | RED | X | X | X | | |
| 6 | X | BLACK | RED | BLACK | RED | RED | X | X | | |
| 7 | X | WHITE | BLUE | BLACK | BLUE | X | X | X | | |
| 8 | X | BLACK | BLUE | BLACK | BLUE | BLUE | X | X | BLACK → BLUE | BLACK → BLACK |
| 9 | X | BLUE | BLACK | BLACK | BLUE | BLUE | X | X | | |
| 10 | X | BLUE | BLUE | BLACK | BLACK | BLUE | X | X | | |
| 11 | X | BLUE | BLUE | BLACK | BLUE | X | X | X | | |

PERIPHERAL PIXEL — TARGET PIXEL — PERIPHERAL PIXEL

BLUE MARKER

RED GHOST REGION    BLUE GHOST REGION

FIG. 13A 
RED  BLACK  BLUE

FIG. 13B 
BLUE  BLACK

FIG. 13C 
BLACK  RED

FIG. 14

COLOR MARKER
PAINTED OUT

FIG. 15

| | | | TARGET PIXEL | | |
|---|---|---|---|---|---|
| A BLURRED PATTERN | x | x | RED | WHITE | RED | x |
| B BLUR CORRECTION PATTERN | x | x | RED | RED | RED | x |

FIG. 16

| | | | TARGET PIXEL | | |
|---|---|---|---|---|---|
| A BLURRED PATTERN | x | x | BLUE | WHITE | BLUE | x |
| B BLUR CORRECTION PATTERN | x | x | BLUE | BLUE | BLUE | x |

FIG. 17

| | | | | TARGET PIXEL | | | |
|---|---|---|---|---|---|---|---|
| A BLURRED PATTERN | x | x | RED | WHITE | WHITE | RED | x |
| B BLUR CORRECTION PATTERN | x | x | RED | RED | RED | RED | x |
| C BLURRED PATTERN | x | RED | RED | WHITE | RED | RED | x |
| D BLUR CORRECTION PATTERN | x | RED | RED | RED | RED | RED | x |

FIG. 18

| | | | | TARGET PIXEL | | | |
|---|---|---|---|---|---|---|---|
| A BLURRED PATTERN | x | x | BLUE | WHITE | WHITE | BLUE | x |
| B BLUR CORRECTION PATTERN | x | x | BLUE | BLUE | BLUE | BLUE | x |
| C BLURRED PATTERN | x | BLUE | BLUE | WHITE | WHITE | BLUE | x |
| D BLUR CORRECTION PATTERN | x | BLUE | BLUE | BLUE | BLUE | BLUE | x |

COLOR IMAGE PROCESSING APPARATUS WITH COLOR GHOST CORRECTION

BACKGROUND OF THE INVENTION

The present invention relates to a color image processing apparatus which is peculiarly well fitted for an image processing apparatus such as a color copier in which a plain paper is used as a recording paper. The invention especially relates to a color image processing apparatus in which color ghost correction processing can be changed when a region is designated.

Furthermore, the invention relates to a color image processing apparatus having a partial color conversion function, to which the function to prevent a region designating color from becoming blurred is added to the color ghost correcting function.

In a color image processing apparatus such as a color copier in which laser beams are used, color image information is obtained by dissolving plural colors on a color document, and color images are recorded according to the color image information.

A color copier of this kind is designed and made so that it can conduct various image processing such as variable magnification processing and partial color conversion processing.

Partial color conversion processing means an image compiling process in which the color image information inside or outside the designated region can be recorded by the color used when the region is designated.

Figure 10A:
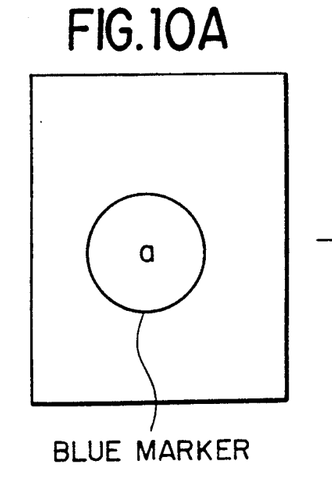
FIG. 10A & B is a schematic illustration of a partial color conversion process.
Figure 10B:
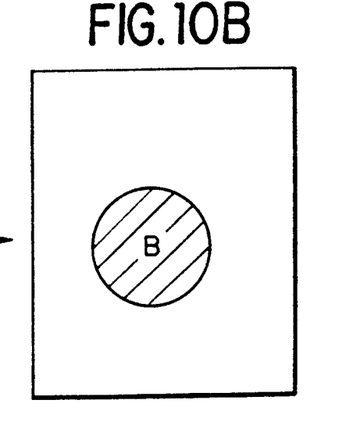

Designation of the region is usually conducted by a color marker. For instance, when the region a is designated by a blue marker as shown in FIG. 10A, the image within the region a is recorded by the color which was used to designate the region, wherein it is blue in this example. Refer to FIG. 10B.

If the image in another region needs to be erased, the images in the region can be recorded as black and white images.

Figure 11:
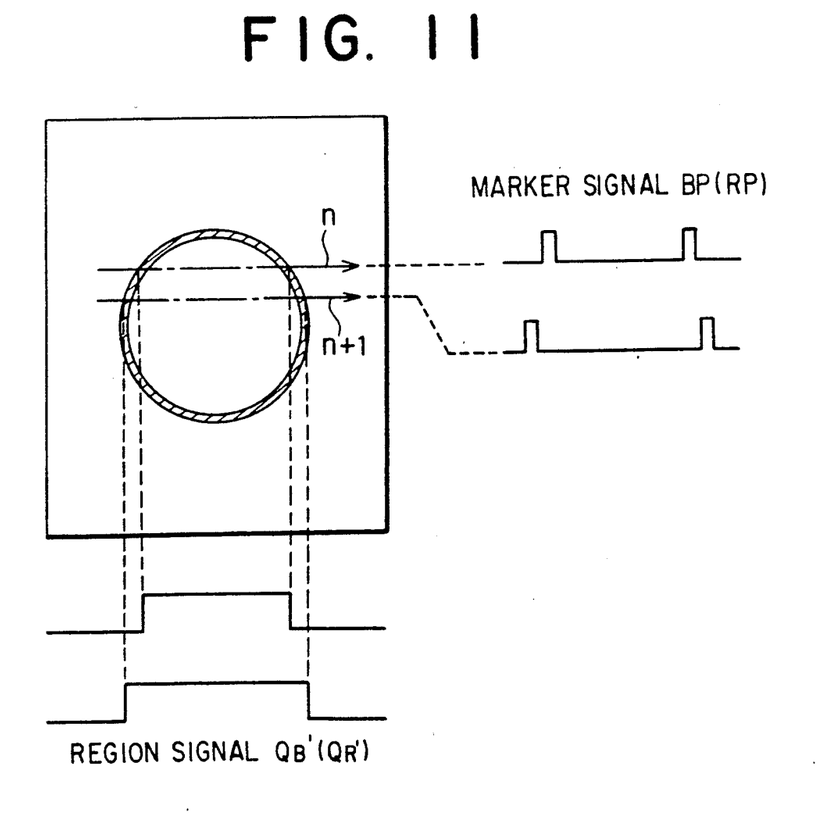
FIG. 11 is a drawing which shows the relationship between color markers, marker signals, and region signals.

In order to attain the partial color conversion mode, it is necessary to detect the color of a color marker used to designate the region, and the region itself. In order to boundaries for the region as shown in FIG. 11, the marker signals BP and RP are detected from the color marker which is formed across each scanning line (n, n+1, and so forth) and at the same time the region signals QB' and QR' are formed by the process.

According to these marker signals BP and RP, and the region signals QB' and QR', the images in the designated region are extracted and recorded and the recording processing shown in FIG. 10B is attained.

To change the subject slightly, there are color image processing apparatuses with a color ghost correcting function in addition to a partial color conversion function.

Color ghost is an unnecessary color signal which appears when an image signal is discriminated as plural color signals.

Namely, when a color image signal is discriminated, unnecessary color ghost appears in the peripheral area of black letters.

Figure 12:
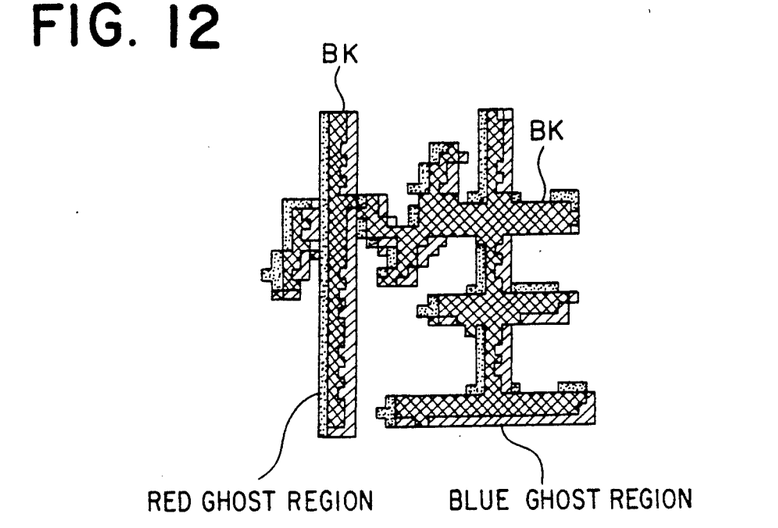
FIG. 12 and FIG. 13A, B & C are schematic illustrations of color ghosting.
Figure 13A:
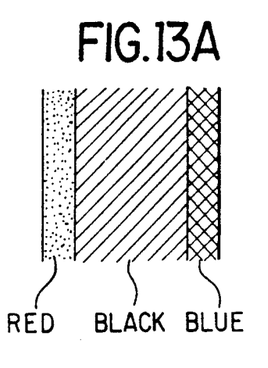
Figure 13B:
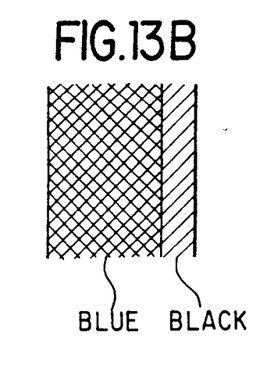
Figure 13C:
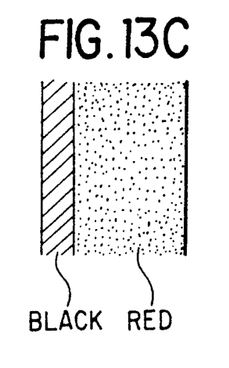

FIG. 12 shows an example of color ghost generation. In this example, a Japanese letter " " (sei, gender) is picked up and color ghost generated after color separation is shown. This example depicts that the color ghost of red and blue appears at the edge of the black line, that of black appears at the edge of the blue line, and that of black appears at the edge of the red line, as shown in FIGS. 13A through 13C.

Other color combinations produce different color ghosts.

In many cases, the color ghost correction means is installed in apparatuses to obtain the object of reducing color ghosts and improving quality of recorded images.

When color ghost is corrected by this kind of color correction means, the color correction means sometimes misjudges the image information of a document when the partial color correction mode is selected.

Figure 14:
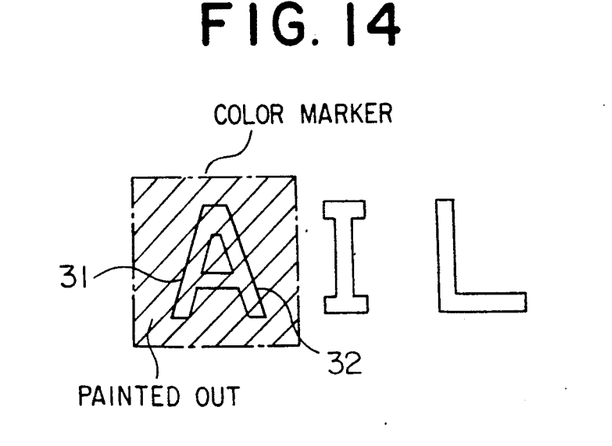
FIG. 14 is a drawing which shows an example of color marker designation.

When a specific region is painted out with a color marker as shown in FIG. 14 to record only the region, the contours 31, 32 of the image within the color marker become blurred.

The reasons are as follows.

For instance, if a red or blue marker exists around a black letter and the edge of the black letter is discriminated by a red or blue marker, the overlapped part is not discriminated as an image which is necessary for recording, even if it is an edge of the black letter.

The reason for that is because a color marker is only for detecting the region and a color marker portion is not recorded. That is the reason why the edges of images become blurred or narrow.

As explained above, color ghost correction has a special function to correct red and blue ghosts which appear around black letters. So, the peripheral part of a black letter is converted to white and the color conversion processing is not conducted.

The main object of the present invention is to solve these problems in a simple and cost-effective manner. The invention provides a color image processing apparatus which can prevent deterioration of image quality by changing the contents of color ghost correction when a specific color image is processed.

In a color image processing apparatus equipped with a partial color conversion function, the region of a color marker must be detected accurately as explained above. But the accuracy greatly depends on the manner in which the color is drawn.

Namely, when a color marker is drawn on a document correctly with high density, the color marker can be detected accurately. On the other hand, if a color marker becomes blurred in some places, then the color marker regions cannot be accurately detected.

When the output level of a CCD, which is quite often used to read images, is a little different, the color of a color marker and a black image overlap each other.

There are several methods to avoid this problem, such as adjusting the color marker region judging means or the blurred place correcting means. As a color marker can be detected accurately by applying these methods to the operation, false detection of the designated region caused by a blurred color marker or imbalance of the CCD level, can be eliminated.

But in the case when the region judging means is utilized, it becomes disadvantageously complicated. The region judging means is used to judge whether the information of the previous process should be used or not when a color marker becomes blurred, or even when a color marker becomes blurred, the region judging means should judge whether to neglect the information about several lines or several bits or not.

If blurred parts are needed to be corrected, an exclusive blurred part correcting means must be installed. Furthermore, it is necessary to process data in the blurred part correction means as well as in the region judging means. As a result, structure of the control circuit becomes complicated and it leads to high costs. It can be said to be a disadvantage.

Considering the circumstances, the second object of the present invention is as follows. A color image processing apparatus which has a color ghost correcting function in addition to a partial color conversion function, processes color marker blurred parts by appropriately utilizing the color ghost correction function.

SUMMARY OF THE INVENTION

In order to solve the problems mentioned above, the present invention has the following characteristics. A color image processing apparatus in which color image information is converted to an electric signal is processed, comprising; a color discriminating means: a color ghost correction means; and an image processing means, by which image processing of a designated region is conducted according to color information different from the color of a document to be read out, and the content of the correction of the color ghost correction means is changed when image processing of the designated region is conducted.

The data to be used for color ghost correction in the normal recording mode, is held in the color ghost correcting means 30. In addition, slightly changed color ghost correcting data for the partial color conversion mode, is also held in the color ghost correction means.

Accordingly, color ghost correction processing is conducted using the normal color ghost correcting data in the normal recording mode.

Figure 8:
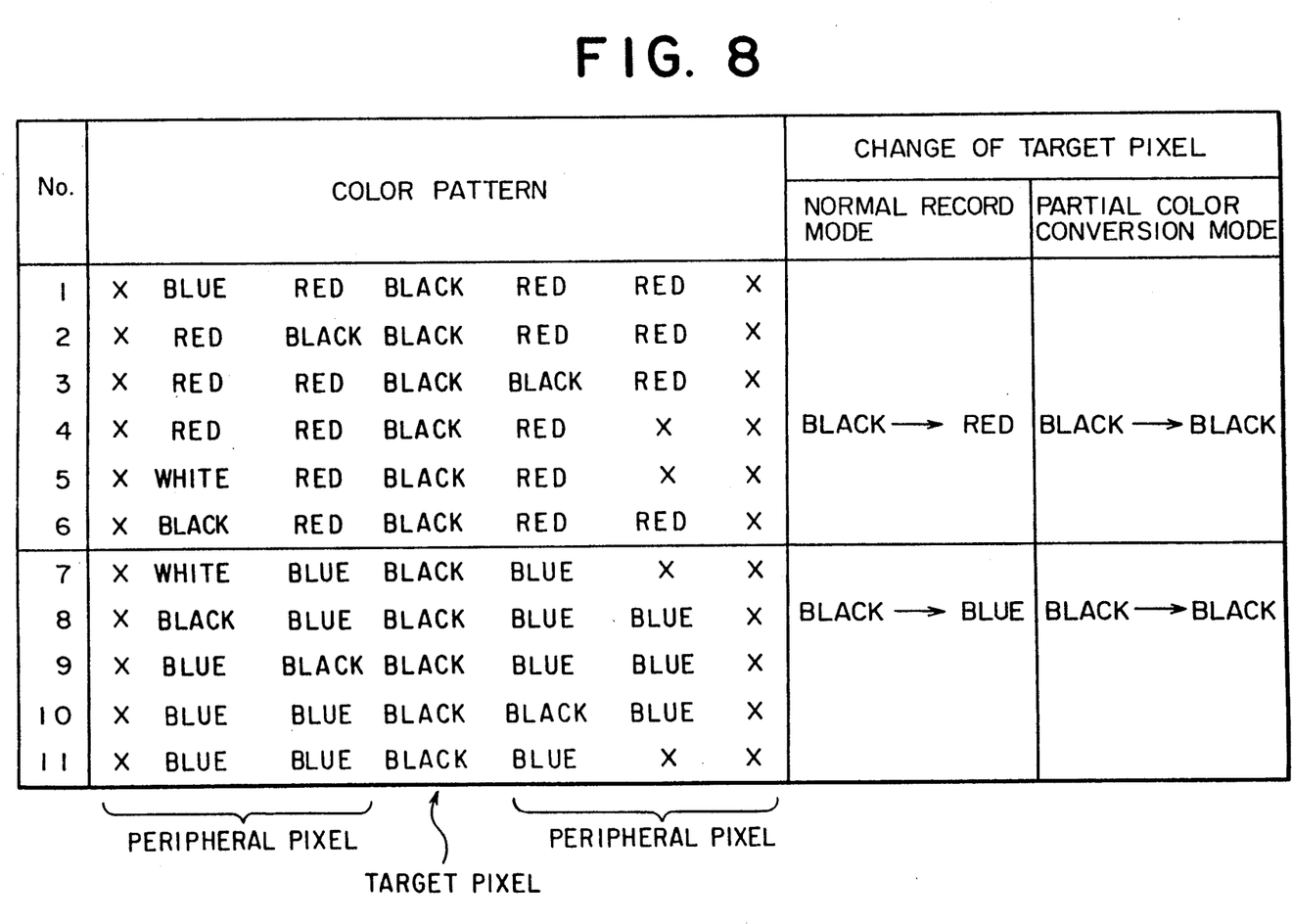
FIG. 8 is a table which shows the relationship between the operation mode for specific color patterns and the details of correction.

When the partial color conversion mode is selected and the color patterns are those shown in FIGS. 13A through 13C, the data by which color ghost correction processing is not conducted, as shown in FIG. 8, is referred to.

When the color ghost correcting data to be used is selected according to the operating mode as explained above, the contour of the color image does not become blurred or narrow even if color ghost correction processing is not conducted. For that reason, even if a fine line such as a ruled line is painted out by a color marker, the ruled line is reproduced.

The present invention aims at a color image processing apparatus to process an electrically converted color image signal so that blurred color marker correction can be conducted by using the color ghost correction means appropriately in order to attain the second object of the invention. This apparatus comprises a color discriminating means, a color ghost correcting means, and a color image processing means to process color images of a designated region according to the color information different from the color of a document to be read out. The color ghost correction means is used as the color information correction means for designating the region. The characteristics of the invention are explained above.

The apparatus is made so that the color information correction means for designating the region can be included in the color ghost correction means 30. In the normal recording mode, the color ghost correction means 30 only conducts color correction processing.

When the partial color conversion mode is selected, the color ghost correction means 30 conducts both the color ghost correcting process and the blurred part correcting process.

The reason why the color ghost correction means 30 can also conduct the blurred part correcting function, is that the pattern of blurred parts is similar to the color ghost pattern. In this case, the appearance of blurred ghost patterns is shown in FIG. 15A, FIG. 16A, FIG. 17A, FIG. 17C, FIG. 18A, and FIG. 18C. This is because the color region of a color marker is not detected as the original color region due to blurring.

Figure 6:
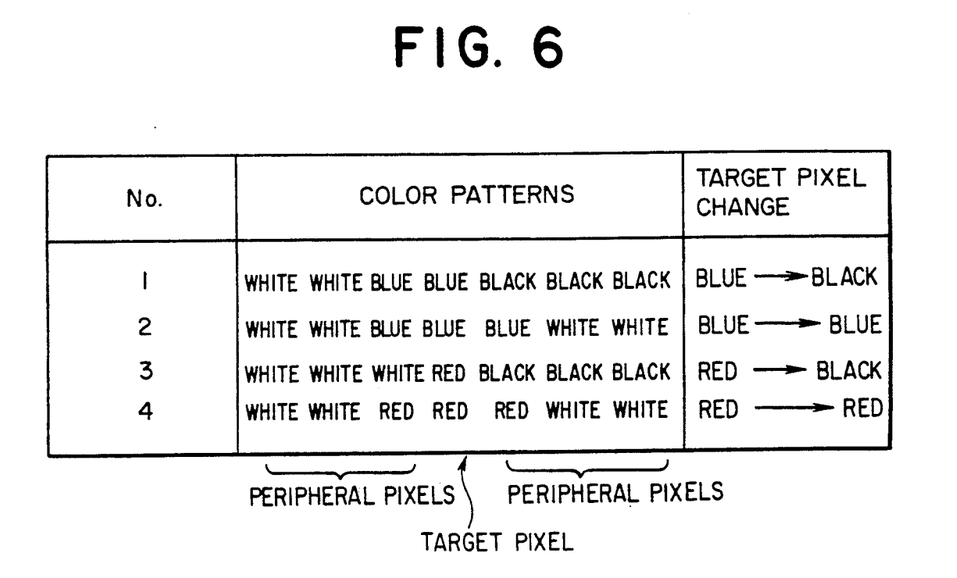
FIG. 6 is a table which is used to explain color ghosts.

On the other hand, the appearance of the color ghost pattern is shown in FIG. 6. Accordingly, the states of their appearance are different from each other, so the color ghost is never misjudged to be a blurred pattern.

DETAILED DESCRIPTION OF THE INVENTION

Figure 1:
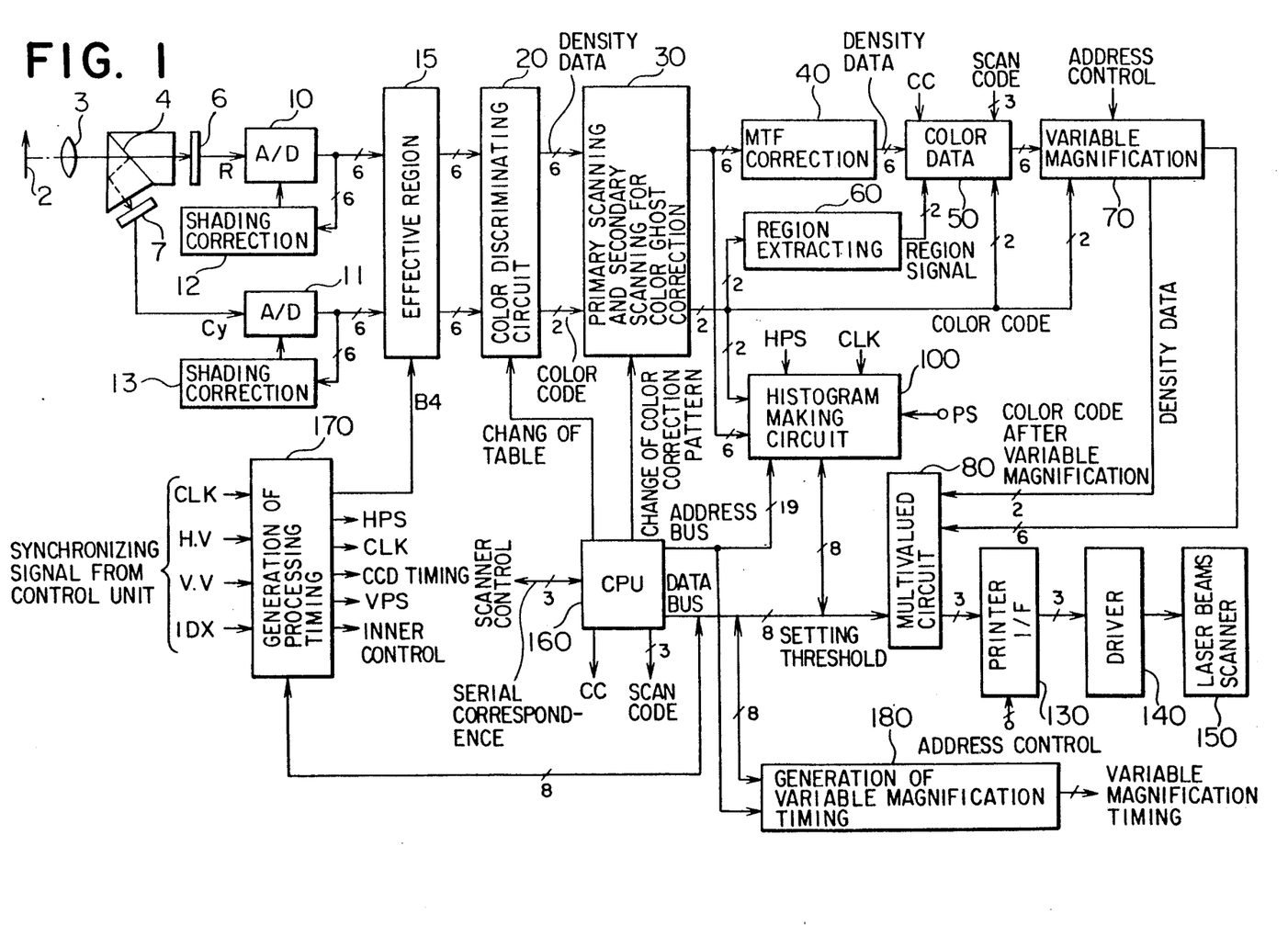
FIG. 1 is a block diagram of an example of a color image processing apparatus of the present invention.

Referring first to FIG. 1 and the following drawings, an example of the color image processing apparatus according to the present invention which is applied to a color copy machine is explained.

The configuration of the color image processing apparatus is presented in FIG. 1.

The color image information, in other words optical image information, on the document is separated into two color separation images by the dichroic mirror 4. In this example, color image information is separated into red R and cyan Cy color separation images. This color separation is conducted by use of the dichroic mirror 4 having a cut off range of 540 to 600 mm.

Red R and cyan Cy color separation images are supplied to such image reading units as CCDs 6 and 7 through which image signals of red component R and cyan component Cy are provided.

Image signals R and Cy are supplied to analog/digital converters 10 and 11, respectively, where they are converted into digital signals with predetermined bits, 6 bits in this example. Shading correction is then conducted by the shading correction circuits 12 and 13 respectively.

In effective area extracting circuit 15; digital image signals subjected to the shading correction within the maximum document size are extracted and supplied to the color discrimination circuit 20. For documents of B4 size, for example the size signal B4 produced by the system timing signal forming means 170 is used as a gate signal.

Assuming that shaded digital image signals are VR and VC, VR and VC are supplied into the color separating circuit or color discriminating circuit 20 where they are discriminated as one of multiple color signals. This example shows a configuration to discriminate an image signal as one of the color signals: red, blue and black. Namely, possible colors of original images on a document are discriminated per pixel as one of the predetermined colors such as red, blue or black. Through this discriminating operation, the document is deemed to consist of images whose color is one of red, blue or black. In this example, the predetermined colors are determined on the basis of recording colors of a recording apparatus, however, it is possible to use more than four colors including these predetermined three colors.

Each discriminated color signal consists of color code data, which is 2-bit data, and density data, which is 6-bit data. The data of each color signal is discriminated against a, that stored in the color discrimination converting table or map, stored in for example, a ROM.

Figure 2:
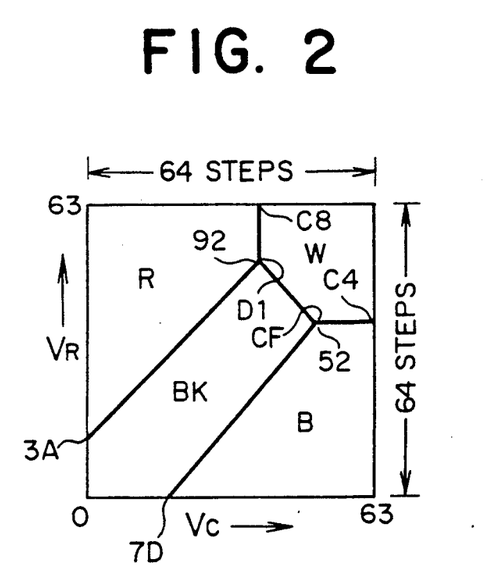
FIG. 2 is a color discriminating map.

FIG. 2 is one of the examples of the color discrimination maps. The system can be organized so that a plurality of color discrimination converting tables are prepared and one out of these is chosen according to the recording mode. In this case, the table is chosen by a signal from a microcomputer which will be explained later.

Color discriminated image data is transferred to the color image processing step.

First of all, the image data is supplied to the color ghost correction means 30 of the next stage where color ghost correction is conducted in the primary scanning direction, in other words the horizontal scanning direction, and in the secondary scanning direction, in other words the drum revolution direction.

This color ghost correction is made to prevent undesirable color ghost around letters, especially black, during color separation, in other words, color discrimination.

The color ghost correction means 30 is a circuit to correct the color ghost as much as possible. The color ghost correction aims at processing only the color code data.

In the present invention, the color ghost correction means 30 stores both the color ghost correction data which is used in the ordinary record mode and the color ghost correction data which is used in partial color conversion of images, wherein the data is stored in the form of a table. The details will be explained later.

Other image processing includes resolution correction, partial color conversion, variable magnification processing, and multivalue coding processing.

First of all, the image data, after color ghost correction was made, which consists of color code data and density data, is processed in the resolution correction circuit 40. The density data is processed and the resolution, which is called MTF, is corrected.

Factors which deteriorate resolution are problems in the optical system, the optical running system, the signal processing system, and the recording system. The optical system and the optical running system among others directly influence deterioration of resolution.

Figure 3A:
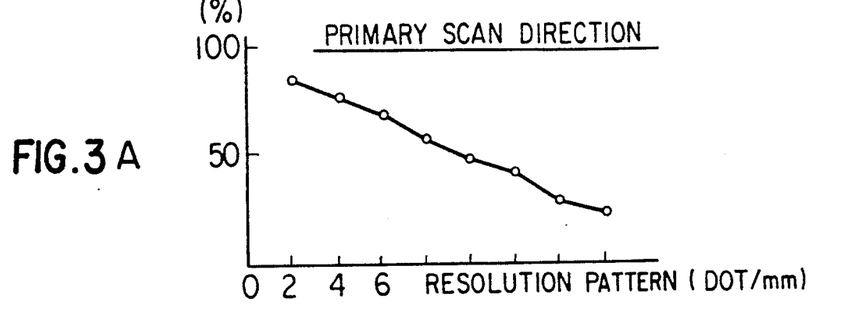
FIG. 3A & B and FIG. 4A & B are characteristic charts which show MTF correction.
Figure 3B:
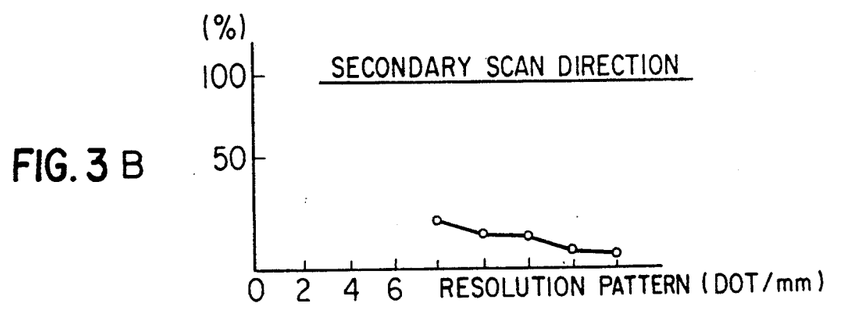

FIGS. 3A and 3B represent represents MFT values of the primary scanning direction and the second scanning direction before resolution correction was made. The data shown in the charts is the result of measurements taken from scanning a black and white image pattern with spatial frequency from 2 dots/mm to 16 dots/mm.

In this case, MTF has been defined as follows:

$$MTF = (W - BK)/(W + BK)(\%)$$

where W indicates a white signal, and BK, a black signal.

Deterioration in MTF is more obvious in the secondary scan direction than in the primary scan direction. To perform correction to a similar extent in the invention, the amount of correction in the secondary scanning direction is preferably adjusted to be twice to four times as much as that in the primary direction.

To perform correction a similar extent in both directions, the primary scan direction and the secondary scan direction, while keeping satisfactory reproduction of fine lines, a resolution correction means preferably consists of a convolution filter with $3 \times 3$ pixel.

Figure 4A:
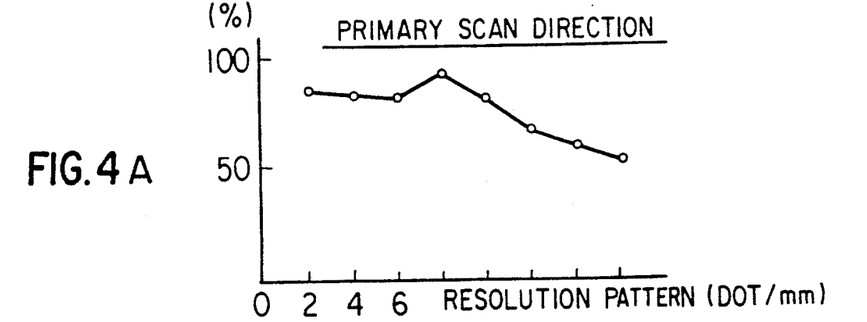
Figure 4B:
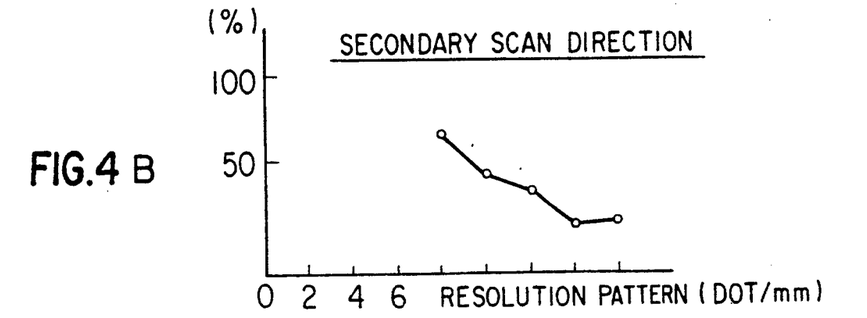

FIGS. 4A and 4B show the results of correction to both the primary scan direction and secondary scan direction using a convolution filter.

The density data and color code data after the resolution was corrected, are supplied to the color data selector 50, and when the partial color conversion mode is selected, the image region is recorded with a specific color.

When image processes such as partial color conversion mode and so forth are conducted, the color marker on the document must be detected and the region must be extracted and designated. For this reason, this embodiment includes the region extract circuit 60 to detect the color marker region on the document. The region signals QR' and QB' (discussed above with regard to FIG. 11) are obtained by detection of the region extract circuit 60 and supplied to the data selector 50.

In addition to these signals, the scan code signal which indicates the color in which images are being copied at the present time and the partial color conversion signal CC are respectively supplied to the data selector 50.

The scan code signal indicates the color in which the image being developed at the present time, in the case of a multicolor copy machine which can record a plurality of specific colors, develops a color at every revolution of the photoreceptor, and transfers the images on the photoreceptor to a recording paper after all colors have been developed.

Accordingly, when a blue marker is detected, it indicates that the machine is set to blue color copy sequence. If the necessary color data is output when the region signal is obtained, the images within the blue color marker are recorded in blue color.

Briefly when the copy machine is not set to the partial color conversion mode and color code data which accords with the scan code is sent, the density data is output. To explain it in more detail, in the case the apparatus is set to red color copy sequence, the necessary density data is selectively output only when the red color code is obtained.

The image data, in other words the density data, which was output from the color data selector 50, is magnified or reduced by the variable magnification circuit 70.

Magnifying and reducing processes are conducted as follows. The density data is interpolated in the primary scan direction and the scan speed is controlled in the secondary scan direction, in other words the photoreceptor rotating direction. If the scan speed is increased, the sampling data in the secondary scan direction is thinned out, and so, the images are reduced. On the other hand, if the scan speed is decreased, the images are magnified.

In this example, the color code data is simultaneously magnified or reduced, then it is supplied to the multivalued circuit 80.

The density data which has undergone the magnifying process or reducing process explained above, undergoes a multivalue process. For instance, 6-bit density data is changed to pentad digitized values by using four thresholds.

The threshold data is set manually or automatically.

In order to determine the threshold data automatically, the histogram making circuit 100 is installed.

Figure 5:
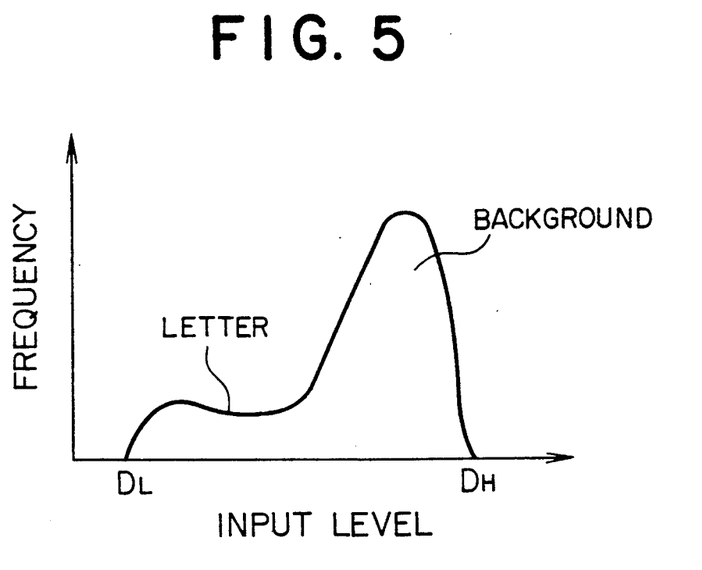
FIG. 5 is a histogram which shows the density of images.

The density histogram shown in FIG. 5 is made from image data processed in the histogram making circuit 100 and according to the density histogram the threshold data which is most suitable to the image is computed.

It is possible to make a density histogram at each color and conduct multivalue processing by the computed data according to the histogram.

The multivalued 3-bit density data is supplied to the driver 140 through the interface circuit 130.

The laser beams are modulated in accordance with the multivalued data at the driver 140. In this example, it is PWM-modulated. The driver 140 can be built into the multivalue circuit 80.

Latent images are formed by PWM-modulated laser beams on a photoreceptor drum which is installed in the output unit 150.

An electrophotographic color copier in which laser beams are used, is applied to the output unit 150. In this example, two component non-contact development, as well as reversal development is adopted.

Namely, the image transfer drum which has been used in the conventional color image forming method, is not used in this case. In order to make the machine compact, three color images consisting of blue, red and black, are developed on an image forming OPC photoreceptor drum while the drum rotates three times. After development, the images are transferred onto a plain recording paper.

Various directions of image forming and timing of image forming are all controlled by the microcomputer or CPU 160.

The system timing signal forming means 170 is capable of various timing. The horizontal and vertical synchronizing signals, HV, VV related to the primary and secondary scan directions which are sent from the output unit 150 including the clock CLK and the index signal IDX, which indicates the start of the scan by laser beams, are supplied to the timing signal generating circuit. According to these signals, the timing signal to start reading CCD 6, 7 is determined.

The timing signal generating circuit 180 produces a variable magnification signal.

When the partial color conversion mode is selected in the present invention, the exclusive data table for color ghost correction which is held in the color ghost correction means 30, are used.

Built into the color ghost correction means 30 is the correction data which is used in the partial color conversion mode and the color ghost correction data which is used in the normal recording mode. The data explained above is used to control the machine according to instructions from the microcomputer 160.

The details are explained below. First of all, color ghost correction will be explained.

To eliminate color ghost, the color pattern method is used since a fixed color ghost appears for an original color, for example:
Original: Black - Color ghost: Red and blue
Original: Red, blue - Color ghost: Black With the color pattern method, the original color can be identified by knowing how a color for a certain pixel and those for its surrounding pixels appear (pattern).

FIG. 6 shows an example which determines the color pattern of the target pixel and its surrounding pixels, and the color of the target pixel to be determined at that time.

For No. 1 which has a color pattern of white and black at its edge, the blue color of that pixel is assumed to be a color ghost produced at the black edge. Likewise, for No. 3, red is assumed to be color ghost of black color. Accordingly, for Nos. 1 and 3, that pixel color is changed from blue or red to black.

On the other hand, for Nos. 2 and 4, no color ghost occurrence is assumed, and the color of that pixel is directly output without being changed.

It is difficult to implement such processing by use of an arithmetic circuit. In effect, this example uses a LUT (look-up table) in ROM form. A one- or two-dimensional system can be used for color patterns. Assuming that the number of colors is N and the number of surrounding pixels including that pixel M, the number of color patterns is:

$$N^M$$

Figure 7:
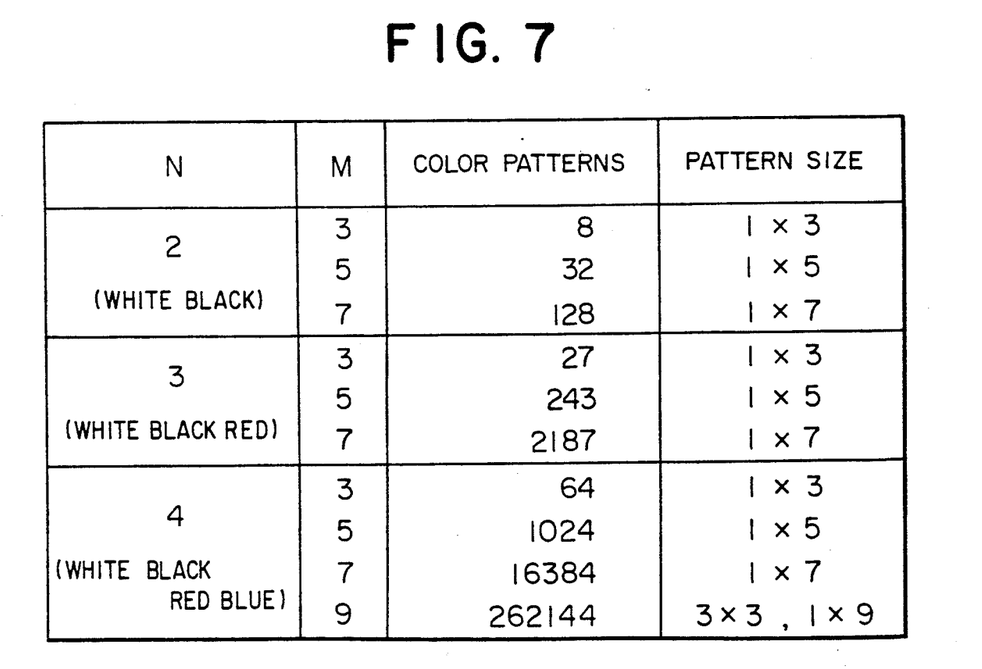
FIG. 7 is a table which shows the relationship between color patterns and pattern sizes.

This means that use of the two-dimensional system increase M extremely and is not practical. In other words, use of the two-dimensional system can provide less surrounding pixels in both primary and secondary directions, with demand for more patterns. FIG. 7 indicates the relationship between size and color pattern.

This example uses signal-dimensional color patterns of a size of $1 \times 7$ ($N=4$, $M=7$) and conducts color ghost elimination in the primary scan direction and in the secondary scan direction, independently. Since there is no difference between color ghost appearance in the primary direction and the secondary direction, the example uses the same color pattern both in the primary scan direction and secondary direction.

This example uses a color pattern with a size of $1 \times 7$, as described above; however, use of color patterns with smaller sizes, such as $1 \times 5$, is possible. The color pattern with a size of $1 \times 5$ can eliminate color ghost of a single pixel, while the color pattern with a size of $1 \times 7$ can eliminate color ghost of two pixels.

If a color pattern with a size of $1 \times 7$ is used, the color code is entered as an ROM address. For such a color pattern as:

the color pattern is thus:

-continued

White : White : Blue : Blue : Black : Black : Black
 11  :  11  :  01  :  01  :  00  :  00  :  00

And the address is:
D40
As shown in FIG. 6, the address contains the black code:
00

Since a 14-bit address is required for a pattern of 1×7, a bipolar ROM should meet the demand for entry of an address of 14 bits and a color code of 2 bits. However, bipolar ROMs with such as large capacity cannot easily be found and would be very expensive, if any. The output of ROM is generally 8-bit.

The working example shows a case where ROM is searched by the first one pixel, and six other pixel codes are used to perform table look-up work. The output data of ROM, $D_0$, $D_1$, is searched when the lead pixel is black. Similarly, the output data, $D_2$, $D_3$ is searched when the lead pixel is blue. The output data, $D_4$, $D_5$ is searched when the lead pixel is red. The output data, $D_6$, $D_7$ is searched when the lead pixel is white.

Therefore, as the lead pixel is white in the color pattern in FIG. 6, both of bit $D_6$ and bit $D_7$ out of the output of ROM are searched. But even if the lead pixel is white and the output bit $D_6$, $D_7$ is searched, the target pixel color codes are different from each other as shown in FIG. 6. The reason is that the ROM addresses to be referred to are different from each other according to the combination of pixels to be input. In this case, the combination of pixels means the combination of color data codes.

In the case of a slow speed and a big capacity, EPROM is used. It is possible to transmit the necessary data to plural SRAM before operation and conduct color ghost correction with this SRAM.

On the other hand, the color pattern shown in FIG. 8 is thought to appear when the color marker is painted out as shown in FIG. 14.

When the color marker covers black fine lines, such as ruled lines, and these black fine lines are the target pixel, the appearance of peripheral pixels corresponding to the target pixel, or two pixels, is shown in FIG. 8. FIG. 8 will be explained as follows. In FIG. 8, a red color marker is used in the color patterns from number 1 to 6 and a blue color marker is used in the color patterns from number 7 to 11.

If color ghost correction is conducted in the usual way in this case, the black pixels are converted to red or blue. Accordingly, ruled lines are not reproduced.

Even if the image is a thick line, the line becomes thin.

In the present invention, the partial color conversion mode is adopted in the case of a specific color pattern like this, and color correction is not conducted even if black pixels exist in the image. Namely, even if it is the same color pattern, the exclusive converting tables are respectively provided so that the pixels are corrected in the normal recording mode and they are not corrected in the partial color conversion mode.

The converting table to be used depends on whether the partial color conversion mode is adopted or not. The table to be used is decided according to the 13th-bit signal supplied by ROM 302 (FIG. 9).

Figure 9:
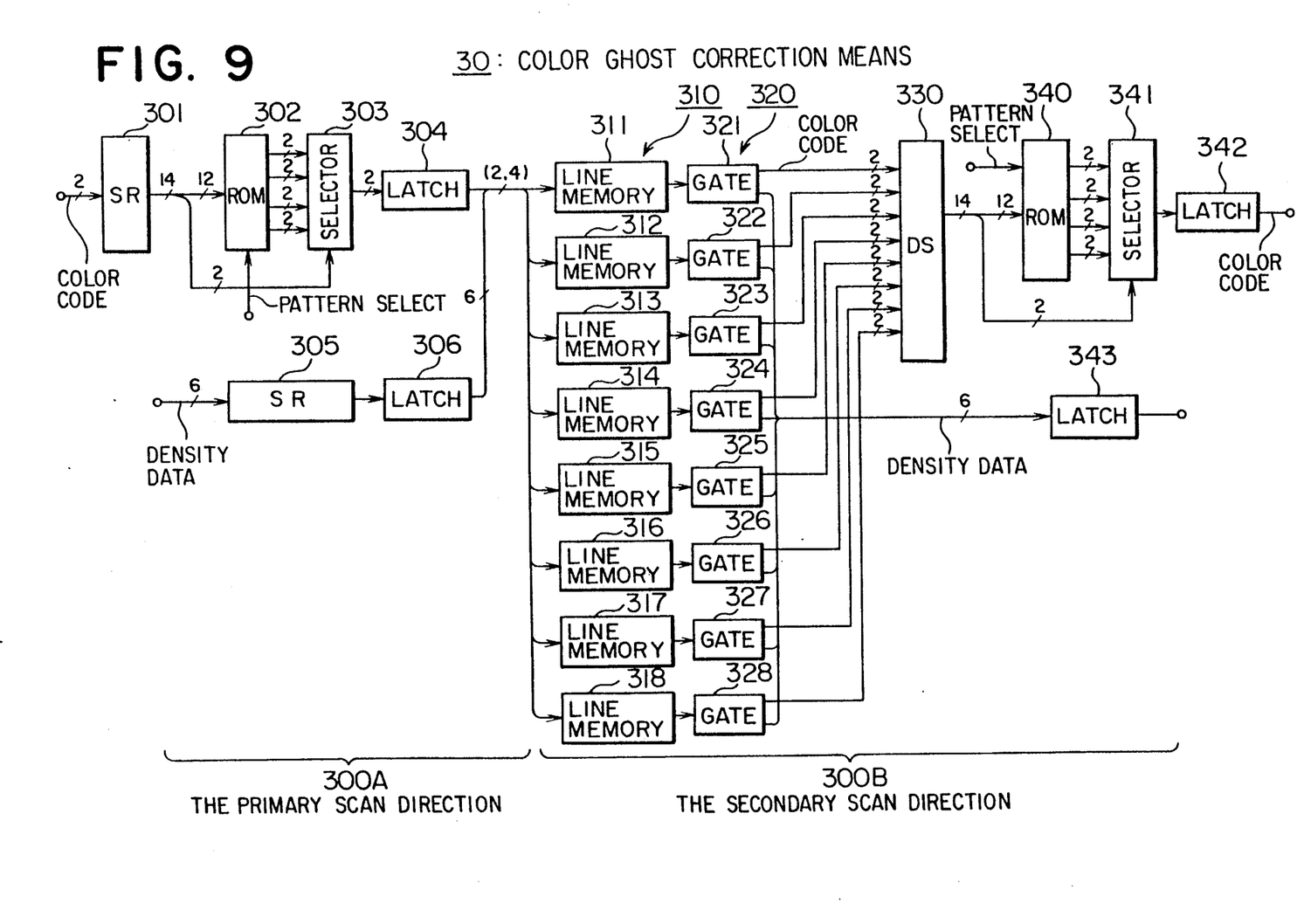
FIG. 9 is a system diagram of the color ghost correction means.

An example of the color ghost correction means 30 which can accomplish such an object, is shown in FIG. 9. The color ghost correction is conducted in the primary scan direction, the horizontal scan direction, and in the secondary scan direction, in other words the vertical scan direction which is the same as the drum rotating direction.

This example is the case of eliminating horizontal and vertical ghost, using the horizontal 7 pixels and the vertical 7 lines of image data.

When color ghost correction processing has been conducted, only color code processing remains to process out of the image data.

In order to achieve this, the color code which is read out from the color discriminating circuit 20, is supplied first of all to the ghost correction circuit 300A to correct the ghost in the direction of the output scan.

The color code data is supplied to the 7-bit shift register (SR) 301 in order, and arranged in a row. The 7 pixels' color code data (2×7 bits) arranged in a row is supplied to ROM 302 which is for eliminating the horizontal ghost, and ghost eliminating processing is conducted at each pixel.

In this example, the maximum bit input of ROM 302 is 13 bits and the maximum bit output of it is 8 bits. So, the leading 2 bits are used as the selection bit. Therefore, the selector 303 is installed in the latter part of ROM 302 and the leading bit is supplied to this selector 303, then the other bits (12 bits) are supplied to ROM 302.

As mentioned before, the color pattern data for color ghost correction and the color pattern data used for the partial color conversion mode are held in ROM 302 in the form of tables.

After ghost processing has been finished, the circuit is latched by the latch circuit 304.

The density data which is output from the color discriminating circuit 20, is supplied to the latch 306 through the shift register (SR) 305 for adjusting timing which is formed by 7 bits, and the data transmitting condition is determined so that the density data can be serially transmitted following the color code data.

The color code data and density data which have undergone serial processing are supplied to the line memory unit 310 which is installed in the color ghost correction circuit 300B.

The line memory unit 310 is installed in order to eliminate the vertical color ghost using the 7-line image data. Although 8-line memory is used in total in this case, it shows one of the methods of real time processing. So, it is possible for the 7-line memory to conduct real time processing.

The 8-line color code data and density data are respectively separated in a group of gate circuits 320. The group of gate circuits 320 is equipped with the gate circuits 321 to 328 corresponding to the line memory from 311 to 318.

The 8-line memory output data synchronized at the line memory 310 is divided into the color code data and density data at the group of gate circuits 320. The separated color code data is supplied to the selection circuit 330 and the 7-line memory color code data which is necessary for color ghost correction, is selected out of 8-line memory in total. In the case the line memory from 311 to 317 is selected, the line memory from 312 to 318 is selected at the next processing timing. The selected line memory is shifted in turn as explained above.

The selected and synchronized 7-line memory color code data is supplied to ROM 340 at the next step to eliminate the vertical ghost.

Elimination of the vertical ghost is conducted in the same way as elimination of the horizontal ghost. The data selector 341 is installed apart from ROM 340 with the capacity of 13-bit input and 8-bit output, and the leading 2-bit is utilized as the signal to select data.

As explained before, the color ghost correction data used in the normal recording mode and the data used in the partial color conversion mode, are respectively built in the form of tables. The 13th bit signal selects the table to be used. The directive signal which is output from the microcomputer 160 (FIG. 1) is used as this signal relating to the operation mode.

After that, the control circuit is latched by the latch circuit 342.

On the other hand, the density data separated by the group of circuits 320, is directly supplied to the latch circuit 343 and output from the circuit after timing control of the density data and color code data.

As explained above, according to the present invention, the color ghost correction data is changed in the case of the partial color conversion mode. In other words, the color ghost correction data used in the partial color conversion mode, is provided in addition to the color ghost correction data used in the normal recording mode, and one of them is selected for use according to the operation mode.

According to the invention, when the partial color conversion mode is selected, the target pixel does not change in a specific color pattern. Therefore, the contour of an image never blurs, narrows, or disappears.

Since color ghost correction is conducted even in the partial color conversion mode, quality of recorded images is improved.

Accordingly, the present invention is peculiarly well fitted for a color image processing apparatus such as the above-mentioned color copier.

Now, a color image processing apparatus will be explained which is equipped with the partial color conversion processing function, the second object of the present invention, and the color ghost correction processing function, comprising the blurred color marker processing means by appropriately using the color ghost correcting means.

In this example, the color image processing apparatus shown in FIG. 1 is used and the color ghost correcting means 30 can be used both as a color ghost correcting means and as a blurred color marker correcting means to designate the region, which will be explained later.

Only when the partial color conversion mode is selected, is the blurred color marker correcting process simultaneously conducted as follows.

Figure 15:
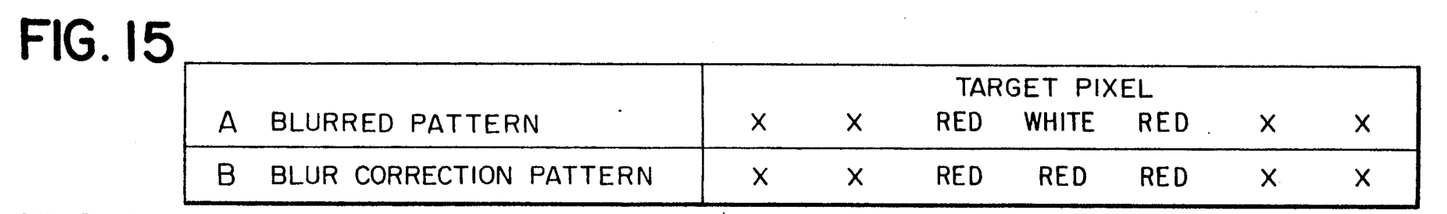
FIG. 15 through FIG. 18 show the relationship between the blurred patterns and the corrected patterns.

The color patterns which can be obtained when a color marker is detected, are shown in FIG. 15.

If there is no blurred part when a color marker is used, a pixel which indicates the color marker lasts over plural pixels. But, if a blurred color marker is found, the pixel does not continue over plural pixels, and white is sandwiched between the pixels.

Figures 16, 17:
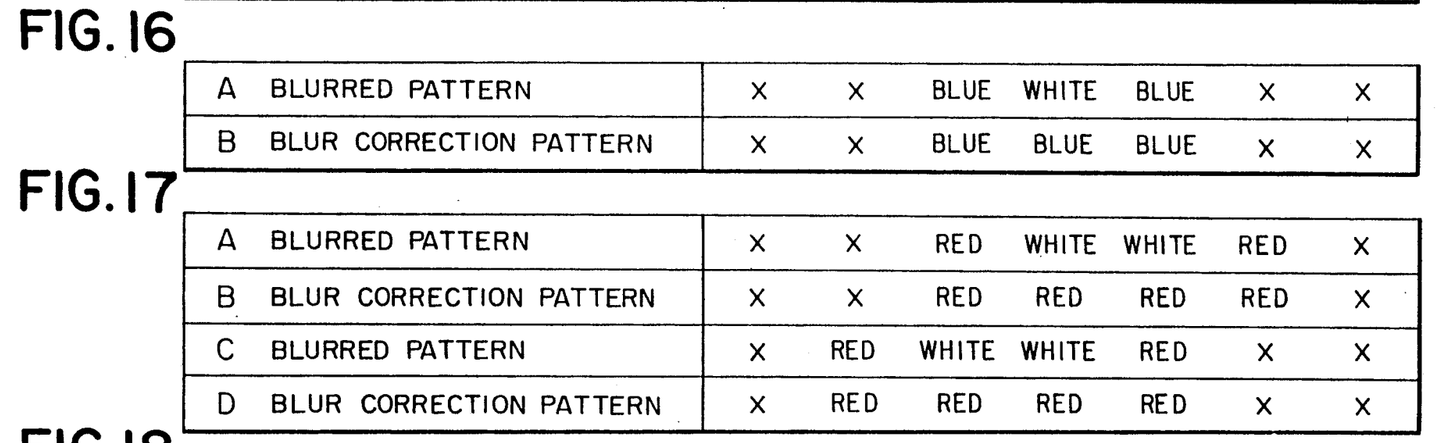
Figure 18:
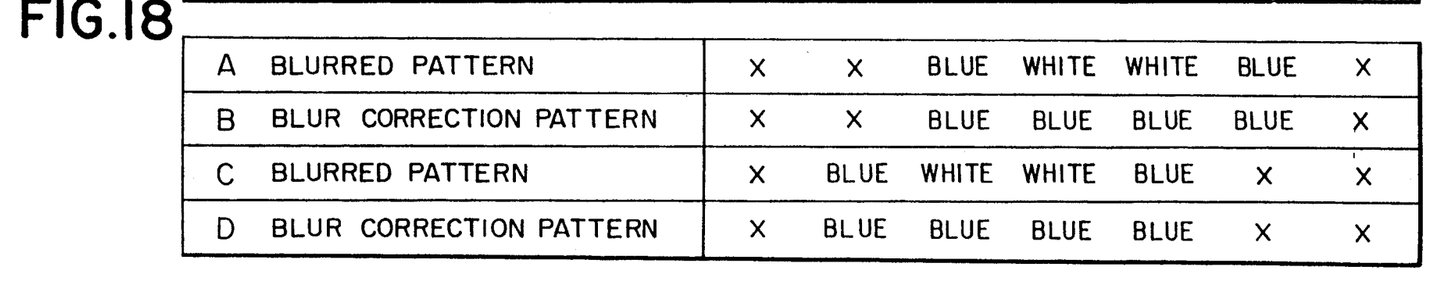

When a blurred part corresponds to one pixel, the blurred patterns are obtained as shown in FIG. 15A, in this case the color marker is red, and in FIG. 16A, in this case the color marker is blue. When a blurred part corresponds to two pixels, the obtained blurred color patterns are shown in FIG. 17A, C, in which case a red color marker is used, and FIG. 18A, C, in which a blue color marker is used.

In the case of blurred color patterns as mentioned above, a white pixel which is sandwiched between pixels which indicate the color markers, can be corrected to show the pixels which indicate the color markers.

Refer to FIG. 15B, FIG. 16B, FIG. 17B, FIG. 17D, FIG. 18B, and FIG. 18D.

The ghost color pattern and the blurred color marker pattern have different combinations of colors when they appear. So, blurred color marker correction can be conducted in the same way as color ghost correction.

In the present invention, color ghost correcting means 30 is provided with a table to correct the blurred color marker and when the partial color conversion mode is selected, this table is referred to.

By making preparations as explained above, when the normal recording mode is employed, the color ghost correcting table is referred to. Accordingly, even if the color patterns shown in FIG. 15 through FIG. 18 are input, they are output as they are. But, when the partial color conversion mode is employed, the blurred color marker correction processing is conducted simultaneously with the color ghost correction processing as shown in FIG. 15 through FIG. 18.

To be more specific, in the color ghost correcting means shown in FIG. 9, ROM 302 and ROM 340 are provided with both the color ghost correcting data and the blurred color marker correcting data in the form of tables respectively. The table to be used is determined by the 13th-bit signal supplied to ROM 302 and ROM 340. The directive signal which is output from the microcomputer 160 is used as this signal relating to the operation mode.

According to the example, the blurred color marker correcting data is held in the color ghost correction means in addition to the color ghost correcting data, and the data is selected to be used according to the operation mode. Namely, the color ghost correction means is also used as the blurred color marker correction means.

According to the structure explained above, when the partial color conversion mode is selected, the blurred color marker correction processing is also conducted in addition to the color ghost correction processing, so this structure has the characteristic that the color marker region can be accurately discriminated. The designated region can be detected by this without being affected by the blurred color marker and by fluctuations in CCD output level.

What is claimed is:

1. An image processing apparatus for processing a color image signal obtained by converting color image information on a document including marking color information, which designates a region on the document, into an electrical signal, comprising:

means for classifying a color image signal representing a color of a pixel as either a first signal indicating a document color or a second signal indicating a marking color and for serially outputting the classified color image signal;

color correction means for receiving the classified color image signal from the classifying means, the color correction means having a plurality of color patterns, each of said color patterns representing a possible color pattern formed by a predetermined number of pixels including a target pixel and having a predetermined color correction instruction corresponding to said color pattern for correcting a color of the target pixel; and control means for detecting the region designated on the document by pixels represented by color image signals classified as second signals, wherein when a target pixel, represented by a color image signal classified as a first signal, in an actual color pattern of classified signals corresponding to the predetermined number of pixels is successive to a pixel represented by a color image signal classified as a second signal at the time of detecting the region, the control means changes the predetermined color correction instruction of the color correction means for the target pixel.

2. The image processing apparatus of claim 1, wherein, when a target pixel, represented by a color image signal classified as a first signal, is successive to a pixel represented by a color image signal classified as a second signal at the time of detecting the region, the control means maintains the color of the target pixel without performing the predetermined color correction instruction of the color correction means.

3. An image processing apparatus for processing a color image signal obtained by converting color image information on a document including marking color information, which designates a region on the document, into an electrical signal, comprising:

means for classifying a color image signal representing a color of a pixel as either a first signal indicating a document color or a second signal indicating a marking color and for serially outputting the classified color image signal;

color correction means for receiving the classified color image signal from the classifying means, the color correction means having a first group of color patterns for correcting a document color and a second group of color patterns for correcting a marking color, each of said color patterns representing a possible color pattern formed by a predetermined number of pixels including a target pixel and having a predetermined color correction instruction corresponding to said color patterns for correcting a color of the target pixel so that the color correction means eliminates color ghost from a document color by using the first group of color patterns and corrects a blurred portion of the marking color by using the second group of color patterns.

4. The image processing apparatus of claim 3, further comprising control means for detecting the region designated on the document by pixels represented by color image signals classified as second signals, wherein when image processing in relation to the marked region is carried out, said control means uses both the first and the second group of color patterns, and when image processing in relation to the marked region is not carried out, the control means uses only the first group of color patterns.

5. The image processing means of claim 4, wherein the control means has a memory for storing the first and second groups of color patterns.

6. The image processing means of claim 3, wherein, when in the second group of color patterns a color of the target pixel is white surrounded by pixels of the marking color, the color of the target pixel is changed to the marking color.

7. The image processing means of claim 3, wherein, when in the second group of color patterns a color of each of two successive pixels, one of which is a target pixel, is white and the two successive pixels are surrounded by pixels of the marking color, the color of the target pixel is changed to the marking color.

* * * * *

UNITED STATES PATENT AND TRADEMARK OFFICE
CERTIFICATE OF CORRECTION

PATENT NO. : 5,031,035
DATED : July 09, 1991
INVENTOR(S) : Yoshinori Abe

It is certified that error appears in the above-identified patent and that said Letters Patent is hereby corrected as shown below:

On the title page, Item [54], and Col. 1 line 2:
Change title "GHOST CORRECTION" to --CORRECTION CIRCUIT--.

Signed and Sealed this

Sixth Day of April, 1993

Attest:

STEPHEN G. KUNIN

*Attesting Officer*     Acting Commissioner of Patents and Trademarks